(12) United States Patent
Park (10) Patent No.: US 6,349,990 B1
(45) Date of Patent: Feb. 26, 2002

(54) COUPLING APPARATUS OF ROOF VENTILATOR

(75) Inventor: Dae-Sung Park, Chollabuk-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/658,168

(22) Filed: Sep. 8, 2000

(30) Foreign Application Priority Data

Sep. 13, 1999 (KR) ............................................ 99-39001

(51) Int. Cl.[7] ................................................ B60J 7/043

(52) U.S. Cl. ............ 296/216.02; 296/224; 292/DIG. 5; 292/DIG. 65; 49/141; 49/394

(58) Field of Search ............................ 296/216.02, 218, 296/224; 292/DIG. 5, DIG. 65; 49/394, 141

(56) References Cited

U.S. PATENT DOCUMENTS

| 4,257,632 A | * | 3/1981 | Destepheno | ............ 296/218 X |
| 4,412,404 A | * | 11/1983 | Manning | ........... 296/216.02 X |
| 4,616,863 A | * | 10/1986 | Bryant | ..................... 49/141 X |

* cited by examiner

Primary Examiner—Dennis H. Pedder
(74) Attorney, Agent, or Firm—Christie, Parker & Hale, LLP (57) ABSTRACT

A coupling apparatus of roof ventilator of hatch for covering and uncovering an opening at a vehicle roof for ventilation and for passengers to escape in an emergency, the coupling apparatus having a hatch arranged to cover a roof opening on a vehicle roof and a toggle link mechanism for link-connecting the hatch and the opening to enable the hatch to be tilted to a direction for vertical movement of the hatch and for covering and uncovering the opening, the apparatus further comprising a recess at a lateral wall surface of the opening and a locking unit at the recess for coupling and releasing the hatch, thereby enabling an easy detachment of the hatch in an emergency.

3 Claims, 8 Drawing Sheets

COUPLING APPARATUS OF ROOF VENTILATOR

BACKGROUND OF THE INVENTION

1. Field of the Invention

The present invention relates to a coupling apparatus of roof ventilator for covering and uncovering an opening provided at a roof of a vehicle for passengers emergency exit.

2. Description of the Prior Art

Figure 1:
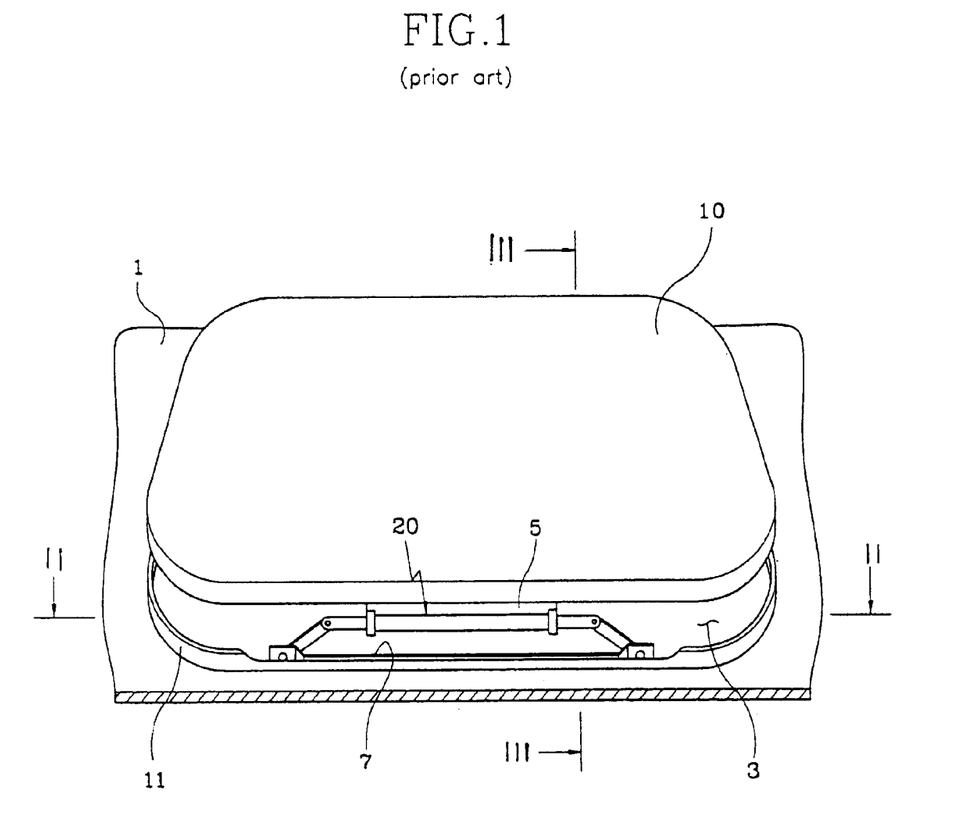
FIG. 1 is a schematic drawing for illustrating a hatch 10 mounted at a ventilation opening 3 on a vehicle roof according to the prior art.
Figure 2:
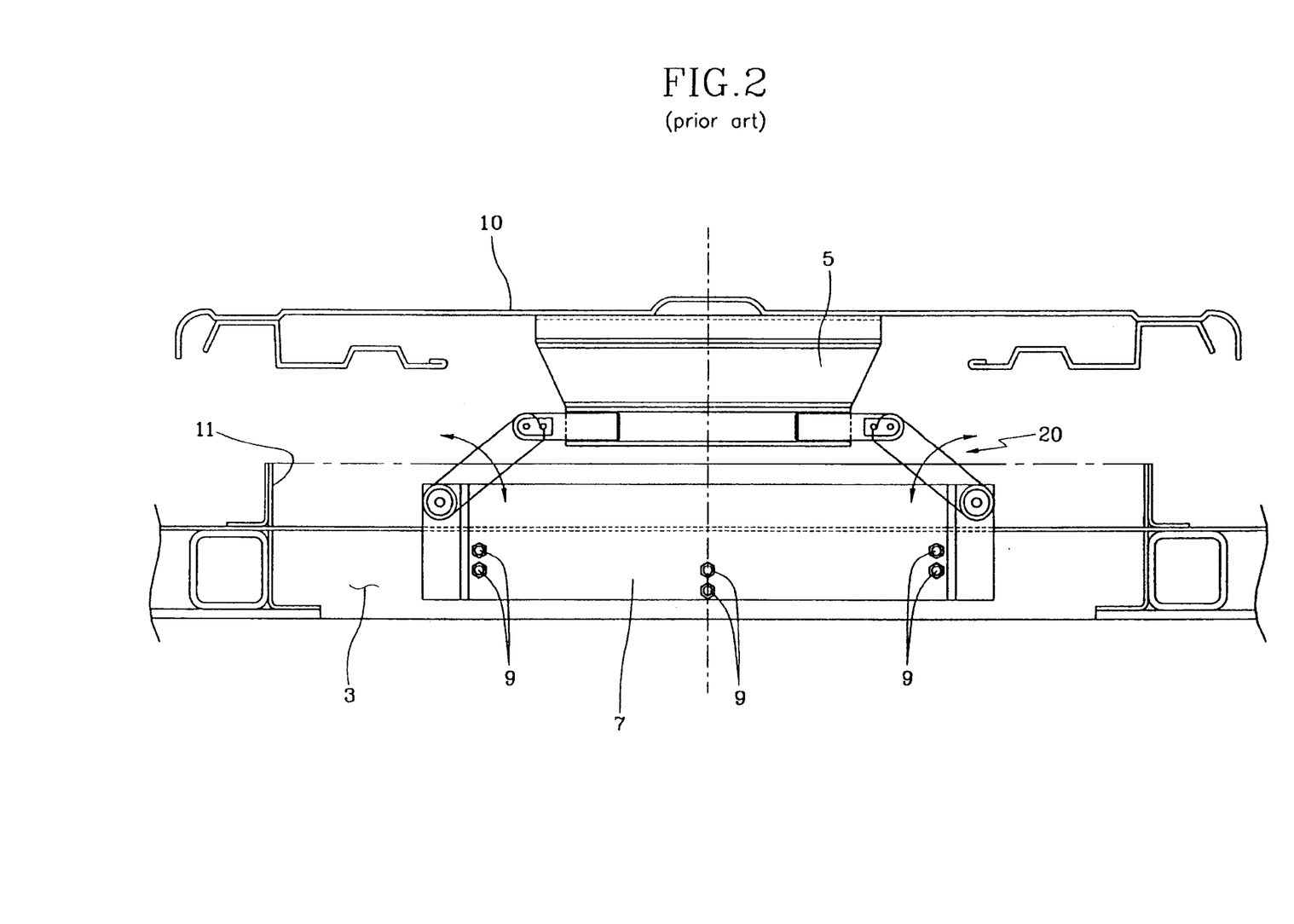
FIG. 2 is a sectional view taken along line II—II of FIG. 1.
Figure 3:
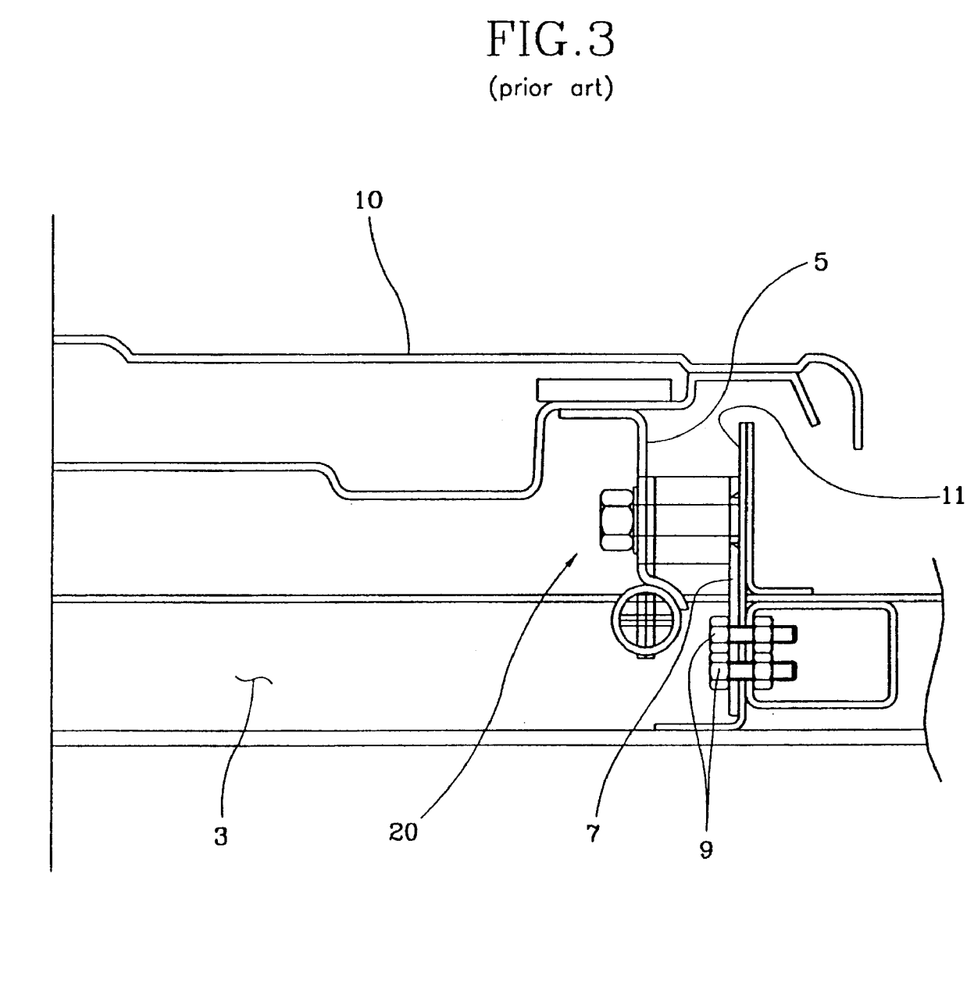
FIG. 3 is a sectional view taken along line III—III of FIG. 1.

Generally, an emergency exit hatch 10 of a vehicle is hinged to a roof 1 for covering and uncovering an opening 3 formed at the roof 1 of the vehicle. The hatch 10 is supported by a rectangular ring type of hatch support member 11 mounted at an inner wall of the opening 3. The hatch 10 is coupled to the hatch support member 11 via a toggle link mechanism 20 so as to be tilted to one direction. The toggle link mechanism 20 is connected between a first bracket 5 secured to a lower side of the hatch 10 and a second bracket 7 secured to the hatch support member 11 and to an inner wall of the opening 3 in order to move the hatch 10 vertically. The second bracket 7 is coupled by a plurality of bolts 9 to an inner wall of the opening 3 and the hatch support member 11.

However, there is a problem in the conventional coupling structure of hatch 10 thus described in that the hatch 10 is coupled via a plurality of bolts such that when there occurs an emergency such as overturn or submergence of a vehicle, the hatch cannot be easily dismantled for passengers to escape therethrough.

SUMMARY OF THE INVENTION

The present invention is disclosed to solve the aforementioned problem and it is an object of the present invention to provide a coupling apparatus of roof ventilator adapted to enable to secure a hatch to a roof for covering and uncovering a roof opening of a vehicle for ventilation in a normal operation and to easily detach the hatch from the roof in an emergency such as overturn or submersion of the vehicle, thereby allowing passengers to easily escape from the vehicle through the roof opening.

In accordance with the object of the present invention, there is provided a coupling apparatus of roof ventilator, the apparatus having a hatch arranged to cover a roof opening on a vehicle roof and a toggle link mechanism for link-connecting the hatch and the opening to enable the hatch to be tilted to a direction for covering and uncovering the opening, the apparatus comprising:

an accommodation part at a lateral wall surface of the opening; and locking means mounted at the accommodation part for locking and releasing the hatch; wherein the locking means comprising:

a plurality of strikers secured to a bracket for fixing the toggle link mechanism to the opening;

a case formed with a hole for the striker to move back and forth therein;

a latch plate formed at a side where the striker enters with a hitching part where the striker is accommodated at initial entry of the striker, the hitching part cooperating with the entry movement of the striker and rotated at a predetermined angle about a rotary shaft within the case to cause the striker to get hitched and coupled; and resilient means arranged between a protruder formed at the latch plate and an inner wall surface of the case for providing a turning effect to a direction initially pushing the striker and providing a turning effect to a direction holding the striker after the striker cooperates with the entry movement to be rotated at a predetermined angle.

BRIEF DESCRIPTION OF THE DRAWINGS

For fuller understanding of the nature and objects of the invention, reference should be made to the following detailed description taken in conjunction with the accompanying drawings in which.

DETAILED DESCRIPTION OF THE INVENTION

Preferred embodiment of the present invention will now be described in detail with reference to the accompanying drawings.

Figure 4:
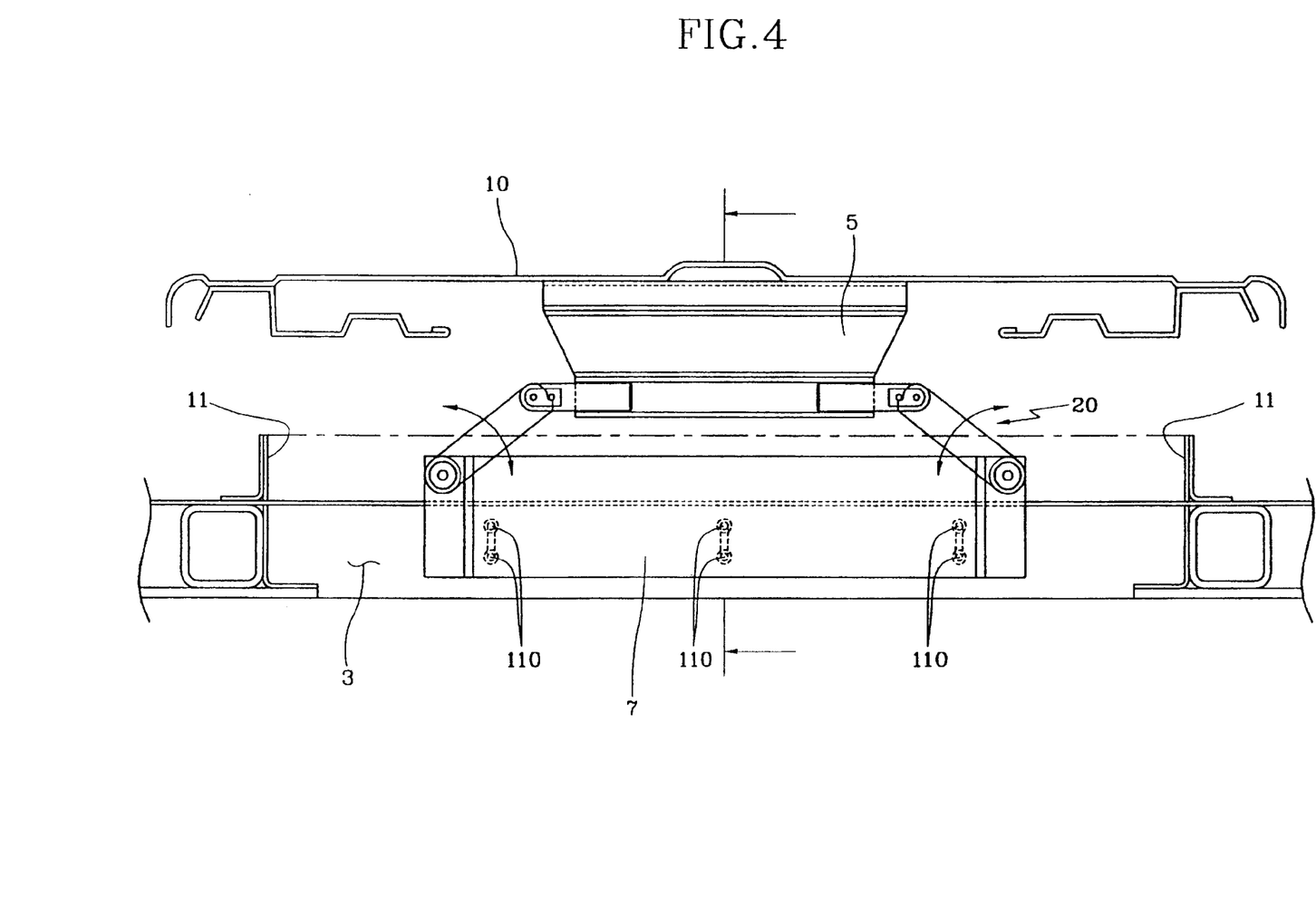
FIG. 4 is a sectional view for illustrating a coupling state of aw ventilation/emergency exit hatch 10 corresponding to FIG. 2 according to the present invention.

FIG. 4 is a sectional view for illustrating a coupling state of a ventilation/emergency exit hatch according to the present invention, where like reference numerals are designated for like or equivalent parts or portions as in FIGS. 1, 2 and 3.

Reference numeral 10 is a hatch for covering and uncovering an opening 3 provided on a vehicle roof 1 for ventilation and assisting passengers in escaping therethrough during an emergency, where the hatch 10 is connected via a toggle link mechanism 20 to a rectangular ring-shaped hatch support member 11 insertedly secured at an inner circumferential wall of the opening 3.

Figure 5:
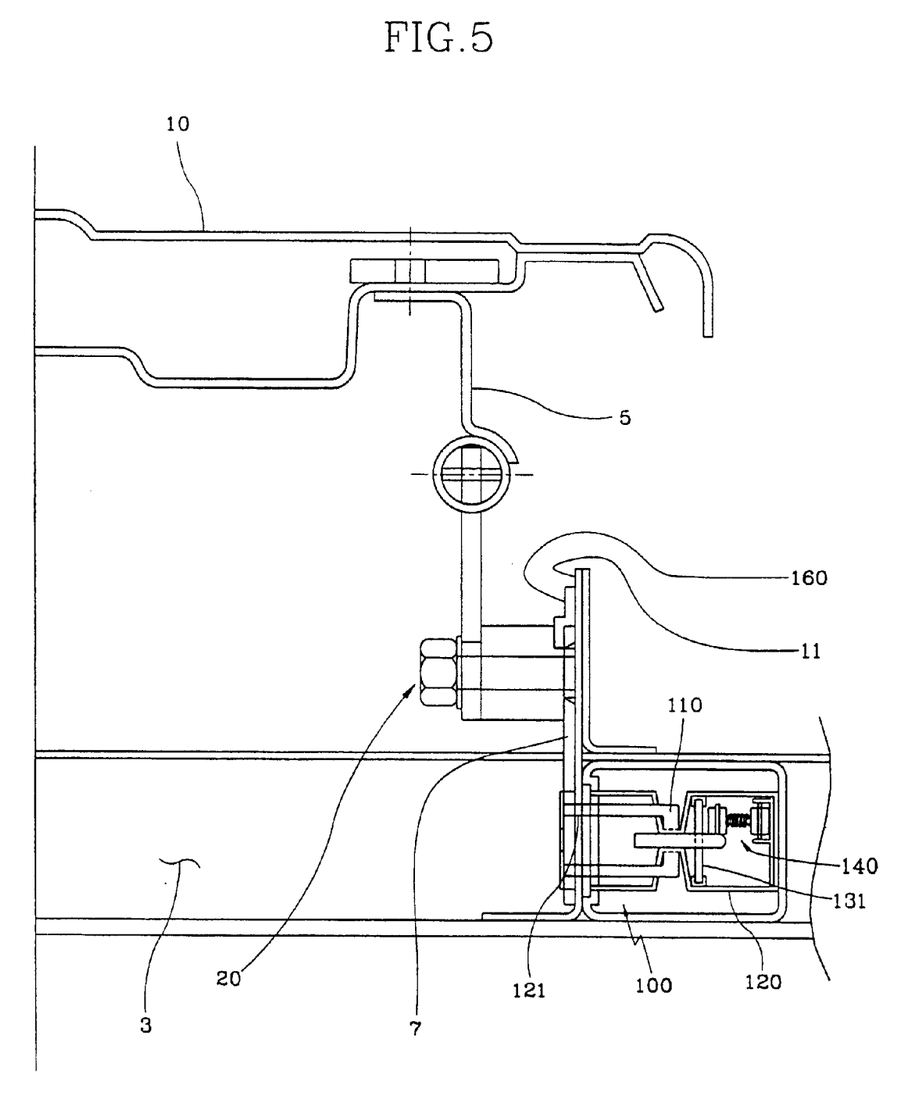
FIG. 5 is a sectional view for illustrating a coupling state of the ventilation/emergency exit hatch 10 corresponding to FIG. 3 according to the present invention.

Furthermore, the toggle link mechanism 20 is connected between a first bracket 5 secured at a lower surface of the hatch 10 and a second bracket 7 releasably connected to the hatch support member 11. The opening is formed at a lateral wall surface thereof with a recess of a predetermined size, and the recess is mounted with locking means 100 for coupling and releasing the second bracket 7. An insertion hole 121 is formed at lateral walls of the hatch support member 11 and the opening 3 with a striker (described later) to move back and forth therethrough.

Figure 7:
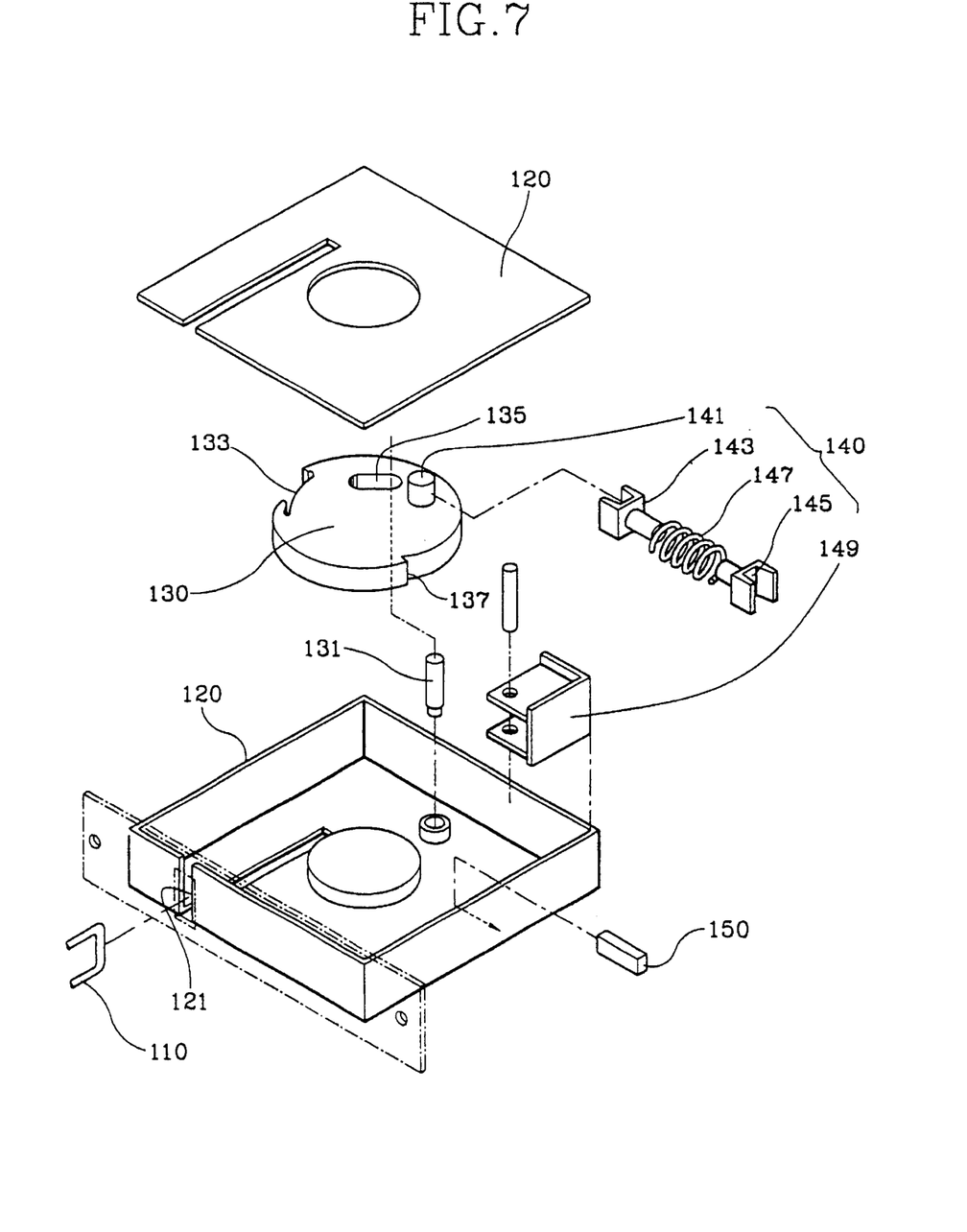
FIG. 7 is an exploded perspective view of a striker 110 and latch means according to the present invention.

The locking means includes a plurality of ""-shaped strickers 110 secured to a bracket for fixing the toggle link mechanism to the opening 3; a case 120 formed with a hole for the striker 110 to move back and forth therein; a latch plate 130 formed at a side where the striker 110 enters with a hitching part 133 where the striker 110 is accommodated at initial entry of the striker 110, the hitching part 133 cooperating with the entry movement of the striker 110 and rotated at a predetermined angle about a rotary shaft 131 within the case 120 to cause the striker 110 to get hitched and coupled; and resilient means 140 arranged between a protruder 141 formed at the latch plate 130 and an inner wall surface of the case 120 for providing a turning effect to a direction pushing the striker 110 before the striker 110 enters the hole and providing a turning effect to a direction holding the striker 110 after the striker 110 cooperates with the entry movement to be rotated at a predetermined angle.

Furthermore, the hitching part 133 of the latch plate 130 includes a recess groove 133a formed to accommodate the striker 110 when the striker 110 initially enters, a guide surface 133b where a tip end of the striker 110 pressingly contacts in cooperation with entry movement of the striker 110 and a circumferential surface is formed about the rotary shaft 131 for the latch to rotate smoothly about the rotary shaft 131, and a hitching groove 133c formed at a tip end of the guide surface 133b for a tip end of the striker 110 get hitched.

The resilient means 140 includes a first fork member 143 rotably supported at the protruder 141, a second fork member 145 formed at a predetermines interval from the protruder 141 and rotably supported at a bracket 149 secured at an inner wall surface of the case 120 and a spring 147 provided between the first fork member 143 and the second fork member 145 for applying resilience to the first and the second fork members 143 and 145.

The latch plate 130 is formed with a long hole 135 of slit type for cushioning a shock applied to the rotary shaft 131.when the striker 110 enters. Of course, a hitching jaw 137 is formed at one side of the latch plate 130 so as to be hitched by the support member 150 secured at a lateral wall of the case 120 and to secure an initial position.

The second bracket 7 is releasably supported at least three points thereof by a support 160 fixed at the hatch support member 11.

Now, operational effect of the present invention thus constructed will be described.

First of all, the toggle link mechanism 20 hinged to the second bracket 7 is rotably and slidably coupled to the first bracket 5 secured at the hatch 10. The striker 110 is then coupled to the second bracket 7 where the hatch 10 and the toggle link mechanism 20 are connected. The locking means 100 is accommodated into the recess provided at the lateral wall of the opening 3.

Figure 8:
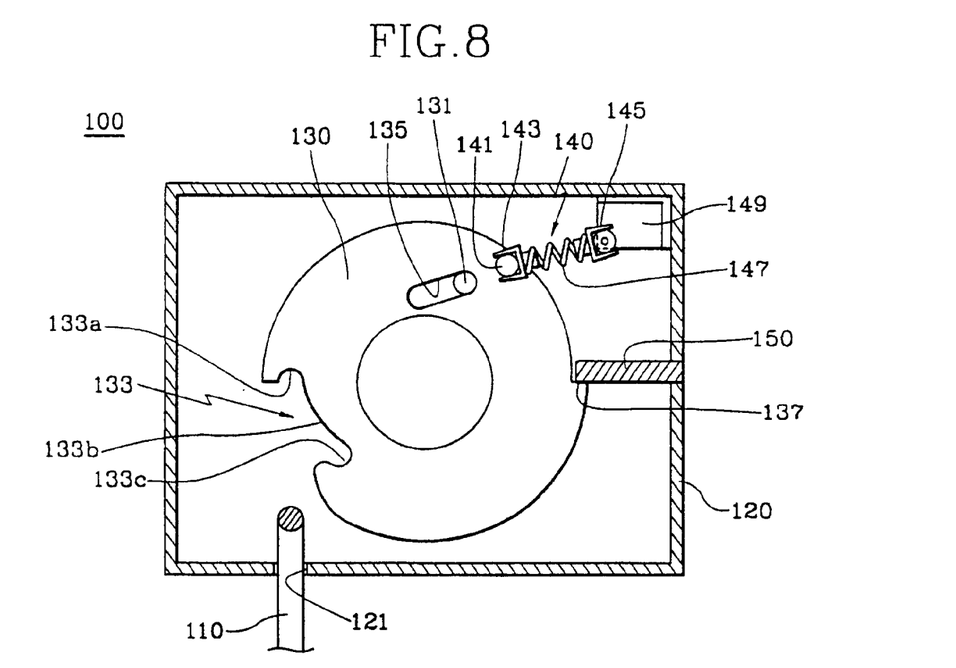
FIG. 8 is a constitutional view for illustrating a state before latch operation of the striker at the latch means according to the present invention.

The striker 110 is pushed into the locking means 100 secured at the recess through the hole 121 (see FIG. 8).

Figure 9:
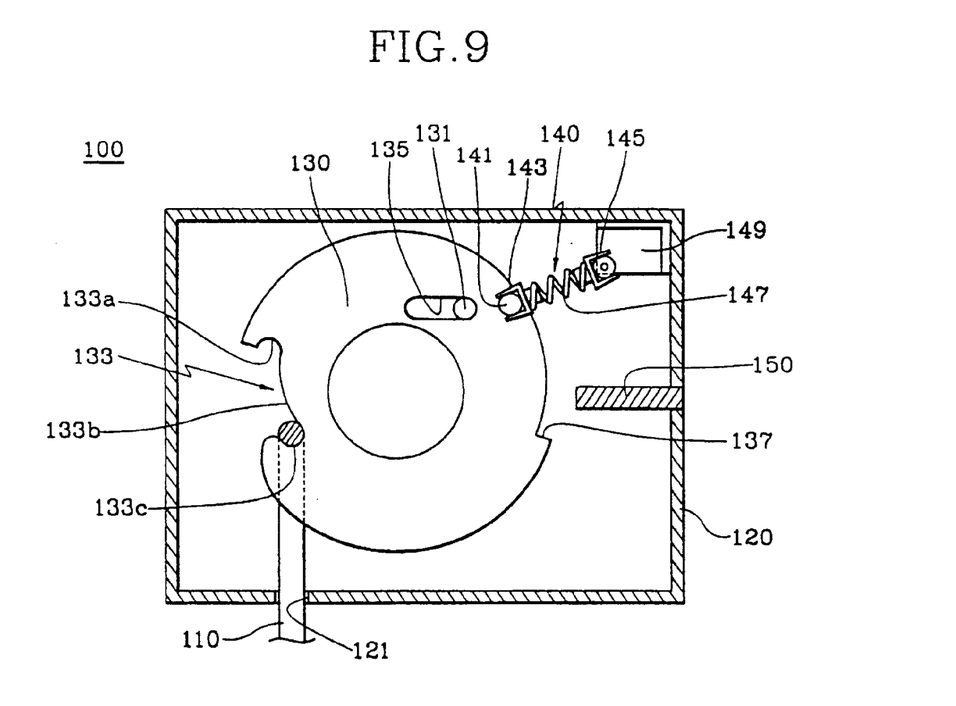
FIG. 9 is a constitutional view for illustrating a latch operation state of the striker at the latch means according to the present invention.

Successively, the tip end of the striker 110 is accommodated into the recess groove 133a of the latch plate 130 and the recess groove 133a is rotated about the rotary shaft 131 of the latch plate 130 in cooperation with continuing entry of the striker 110, where a line connecting direction of force applied from the resilient means 140, center of the rotary shaft 131 and center of the recess groove 133a is bent, as illustrated in FIG. 9, to rotate the latch plate 130 to a direction pulling the tip end of the striker 110 towards an inner side of the recess.

Furthermore, when the latch plate 130 is rotated, the tip end of the striker 110 is guided by the guide groove to be hitched by the hitching groove 133c, which completes the locking of the locking means to vertically move the hatch 10 via the toggle link mechanism 20, enabling the opening 3 to be covered and uncovered.

Figure 6:
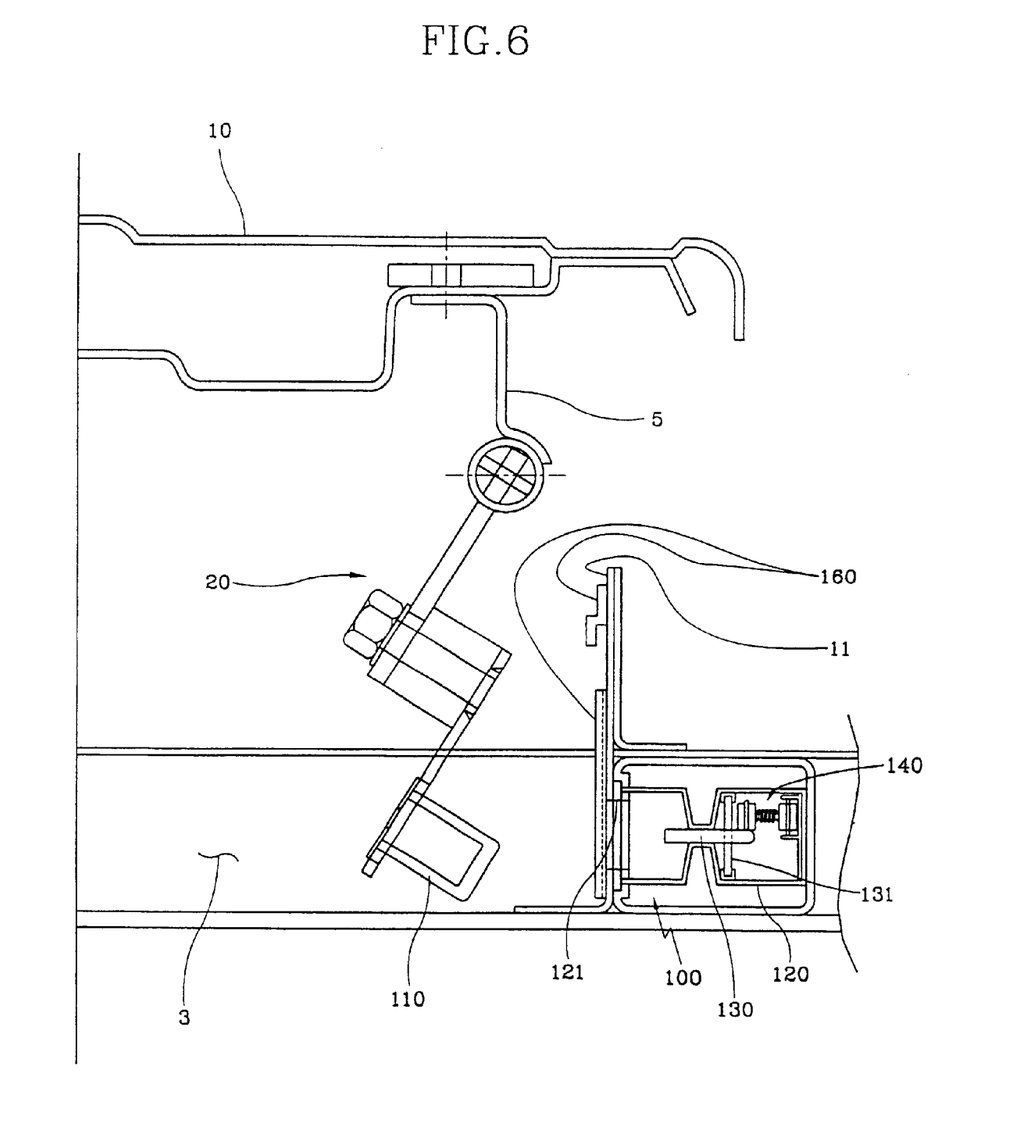
FIG. 6 is a sectional view for illustrating a released state of the hatch 10 during emergency exit from a vehicle according to the present invention.

Meanwhile, if there occurs an emergency such as overturn or submersion of a vehicle, and when passengers pull the second bracket 7 secured at the striker 110 to an inward direction of the opening 3, that is, lengthwise direction of the vehicle roof 1, the striker 110 pulls the hitching groove 133c to bend the connecting line according to equilibrium of power and to allow a pressing force of the resilient means 140 to react to a direction to outwardly push the tip end of the striker 110 via the recess groove 133a, such that the strike 110 and hitching groove 133c can be smoothly release in coupling therebetween.

Successively, when the coupling between the striker 110 and the hitching groove 133c is released, the second bracket 7 to which the hatch 10 is connected is allowed to be detached from the lateral wall of the opening 3, thereby enabling to detach the toggle link mechanism 20 connected to the second bracket 7 and the hatch 10 formed the opening 3.

Accordingly, when there occurs an emergency such as overturn or submersion of a vehicle, the hatch 10 can be easily detached from the opening 3 by passengers, thereby assisting the passengers in escaping from inside of the vehicle through the opening 3.

As apparent from the foregoing, there is an advantage in the coupling apparatus of roof ventilator according to the present invention thus described in that a hatch is fixed at a vehicle roof to cover and uncover an opening for ventilation in normal operation while the hatch is simply detached in an emergency such as overturn or submersion of a vehicle to allow passengers in dangerous situation to easily escape through the opening at the vehicle roof.

What is claimed is:

1. A coupling apparatus of roof ventilator, the apparatus having a hatch arranged to cover a roof opening on a vehicle roof and a toggle link mechanism for link-connecting the hatch and the opening to enable the hatch to be tilted to a direction for vertical movement of the hatch and for covering and uncovering the opening, the apparatus comprising:

an accommodation part at a lateral wall surface of the opening; and locking means mounted at the accommodation part for locking and releasing the hatch; wherein the locking means comprising:

a plurality of strikers secured to a bracket for fixing the toggle link mechanism to the opening;

a case formed with a hole for the striker to move back and forth therein;

a latch plate formed at a side where the striker enters with a hitching part where the striker is accommodated at initial entry of the striker, the hitching part cooperating with the entry movement of the striker and rotated at a predetermined angle about a rotary shaft within the case to cause the striker to get hitched and coupled; and resilient means arranged between a protruder formed at the latch plate and an inner wall surface of the case for providing a turning effect to a direction initially pushing the striker and providing a turning effect to a direction holding the striker after the striker cooperates with the entry movement to be rotated at a predetermined angle.

2. The apparatus as defined in claim 1, wherein the resilient means comprises:

a first fork member rotably supported at the protruder;

a second fork member formed at a predetermined interval from the protruder and rotably supported at a bracket secured at an inner wall surface of the case; and a spring provided between the first fork member and the second fork member for applying resilient force to the first and the second fork members.

3. The apparatus as defined in claim 1, wherein the latch plate is formed with a long hole for cushioning a shock applied to the rotary shaft when the striker enters.

* * * * *